US011248067B2

(12) United States Patent
Jeong et al.

(10) Patent No.: US 11,248,067 B2
(45) Date of Patent: *Feb. 15, 2022

(54) HYBRID SUPPORTED METALLOCENE CATALYST, AND POLYOLEFIN RESIN HAVING EXCELLENT PROCESSABILITY AND USING SAME

(71) Applicant: HANWHA CHEMICAL CORPORATION, Seoul (KR)

(72) Inventors: Dong Wook Jeong, Daejeon (KR); Dong Ok Kim, Seoul (KR); Ui Gab Joung, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 153 days.

This patent is subject to a terminal disclaimer.

(21) Appl. No.: 16/096,809

(22) PCT Filed: Mar. 22, 2017

(86) PCT No.: PCT/KR2017/003066
§ 371 (c)(1),
(2) Date: Dec. 17, 2018

(87) PCT Pub. No.: WO2017/188602
PCT Pub. Date: Nov. 2, 2017

(65) Prior Publication Data
US 2019/0263942 A1 Aug. 29, 2019

(30) Foreign Application Priority Data
Apr. 27, 2016 (KR) .................. 10-2016-0051841

(51) Int. Cl.
| | | |
|---|---|---|
| C08F 4/653 | (2006.01) | |
| C08F 4/6592 | (2006.01) | |
| C08F 210/16 | (2006.01) | |
| C08L 23/08 | (2006.01) | |
| C08F 4/02 | (2006.01) | |
| C08F 4/622 | (2006.01) | |
| C08F 4/646 | (2006.01) | |
| C08F 10/02 | (2006.01) | |
| C08F 210/04 | (2006.01) | |
| C08F 210/14 | (2006.01) | |
| C08F 2/34 | (2006.01) | |
| C08F 2/44 | (2006.01) | |
| C08F 4/642 | (2006.01) | |
| C08F 4/659 | (2006.01) | |

(52) U.S. Cl.
CPC ............ *C08F 4/65925* (2013.01); *C08F 2/34* (2013.01); *C08F 2/44* (2013.01); *C08F 4/02* (2013.01); *C08F 4/6228* (2013.01); *C08F 4/642* (2013.01); *C08F 4/646* (2013.01); *C08F 4/659* (2013.01); *C08F 4/6592* (2013.01); *C08F 4/65904* (2013.01); *C08F 4/65927* (2013.01); *C08F 10/02* (2013.01); *C08F 210/04* (2013.01); *C08F 210/14* (2013.01); *C08F 210/16* (2013.01); *C08F 2500/07* (2013.01); *C08F 2500/12* (2013.01); *C08L 23/0815* (2013.01)

(58) Field of Classification Search
CPC .............. C08F 4/65904; C08F 4/65925; C08F 4/65927; C08F 210/16; C08L 23/8015
See application file for complete search history.

(56) References Cited

U.S. PATENT DOCUMENTS

| | | | |
|---|---|---|---|
| 7,294,600 B2 | 11/2007 | Lee et al. | |
| 2005/0159300 A1 | 7/2005 | Jensen et al. | |
| 2006/0235171 A1 | 10/2006 | Lee et al. | |
| 2010/0121006 A1 | 5/2010 | Cho et al. | |
| 2012/0010375 A1 | 1/2012 | Yang et al. | |

FOREIGN PATENT DOCUMENTS

| | | |
|---|---|---|
| CN | 1697843 A | 11/2005 |
| CN | 101679540 B | 9/2012 |
| EP | 1 517 928 | 3/2005 |
| EP | 2 374 822 A2 | 10/2011 |
| EP | 3 241 854 A1 | 11/2017 |
| EP | 3 339 336 A1 | 6/2018 |
| JP | 2007-197722 A | 8/2007 |
| JP | 2009-507105 A | 2/2009 |
| JP | 2014-210937 A | 11/2014 |
| JP | 2015-501855 A | 1/2015 |
| KR | 10-2008-0057279 A | 6/2008 |
| KR | 10-2010-0028317 A | 3/2010 |
| KR | 10-2014-0067410 A | 6/2014 |

*Primary Examiner* — Caixia Lu
(74) *Attorney, Agent, or Firm* — Sughrue Mion, PLLC

(57) ABSTRACT

The present invention relates to a hybrid supported metallocene catalyst including at least first metallocene compound, at least one second metallocene compound, at least one cocatalyst compound, and a carrier, a preparation method therefor, and a polyolefin resin polymerized in the presence of the catalyst, wherein the second metallocene compound is a compound of a bridged structure having a ligand of an asymmetric structure, and the polyolefin resin has a density of 0.910 g/cm³ to 0.960 g/cm³, a molecular weight density in a unimodal distribution of 3 to 5, a melt index of 0.05 to 100 at 2.16 kg, and a melt flow rate of 20 to 40.

11 Claims, 1 Drawing Sheet

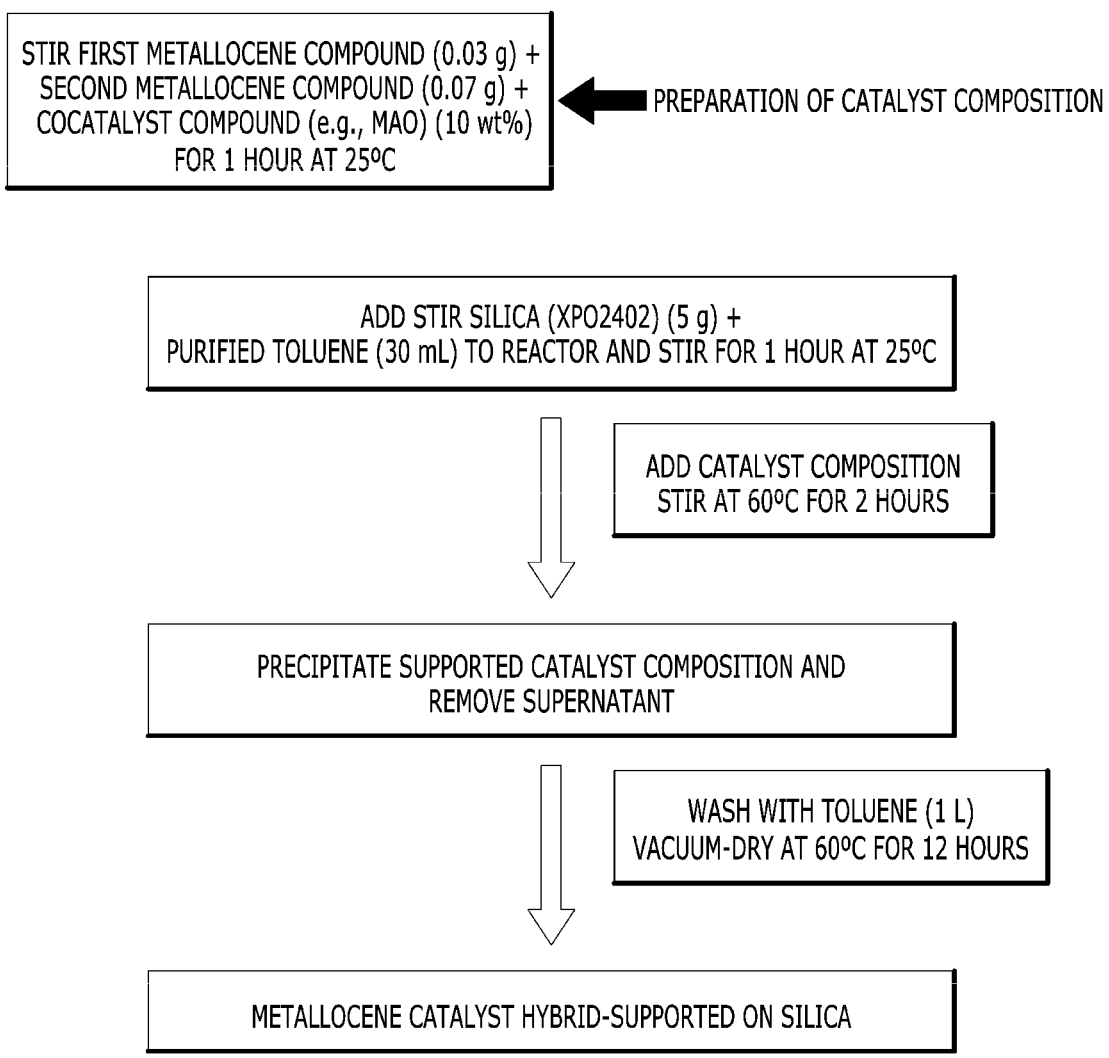

HYBRID SUPPORTED METALLOCENE CATALYST, AND POLYOLEFIN RESIN HAVING EXCELLENT PROCESSABILITY AND USING SAME

CROSS REFERENCE TO RELATED APPLICATIONS

This application is a National Stage of International Application No. PCT/KR2017/003066 filed Mar. 22, 2017, claiming priority based on Korean Patent Application No. 10-2016-0051841 filed Apr. 27, 2016, the disclosure of which is incorporated herein in its entirety by reference.

TECHNICAL FIELD

The present invention relates to a hybrid supported metallocene catalyst, a preparation method thereof, a polyolefin resin prepared using the same and having excellent processability, and a preparation method thereof, and more specifically, a catalyst for appropriately controlling a molecular weight distribution of a resin, which is polymerized by hybrid-supporting a catalyst having excellent comonomer reactivity, a large molecular weight, and a large molecular weight distribution and a catalyst having a low comonomer reactivity, a small molecular weight, and a small molecular weight distribution, a polyolefin resin using the same, and a preparation method thereof.

BACKGROUND ART

Metallocene is basically a transition metal or a transition metal halide compound having a sandwich structure in which a cyclopentadienyl ligand is coordinated. Metallocene has various molecular structures according to a type of ligand and a change of central metal. Generally, a metallocene compound alone is not active as a polymerization catalyst. The metallocene compound is activated to cations by the action of a cocatalyst such as methylaluminoxane, and at the same time, the cocatalyst stabilizes cationically active species coordinately unsaturated as anions that are not coordinated to the metallocene compound, thereby forming a catalyst system having activity in various olefin polymerization.

Since the metallocene catalyst has a uniform active site, a molecular weight distribution of the polymer is narrow, copolymerization is easy, a distribution of a comonomer is uniform, and a stereostructure of the polymer may be controlled according to the symmetry of the catalyst.

Since the metallocene catalyst has a narrow molecular weight distribution due to uniform active sites, the mechanical strength is excellent, but the processability is low. In order to solve these problems, various methods such as changing a microstructure of a polymer or widening a molecular weight distribution have been proposed. U.S. Pat. No. 5,272,236 discloses a method for improving processability by using a catalyst in which a long chain branch (LCB) is introduced into a main chain of a polymer as a side branch. However, there is a problem that activity is low in the preparation of a supported catalyst.

In order to overcome these problems, a method of controlling a high molecular weight and a molecular weight distribution by supporting different metallocene catalysts has been proposed, but this method is not time-effective since a preparation time and an amount of a solvent used are increased due to the respective supporting of the metallocene catalysts.

Thereafter, a method of hybrid-supporting metallocene catalysts having different characteristics has been proposed so as to solve the problem caused by a single catalyst and develop a catalyst having improved activity and improved processability in a simpler manner.

However, a conventional method for preparing polyolefin having a bimodal molecular weight distribution by using catalysts having different reactivity to a comonomer has improved processability due to the bimodal molecular weight distribution, but has different molecular weight distributions and thus low kneading properties. Therefore, there is a problem that it is difficult to obtain a product having uniform physical properties after processing, and mechanical strength is deteriorated.

Thereafter, methods using a dinuclear metallocene catalyst having two active sites have been proposed so as to solve the problem of at least two metallocene hybrid supported catalysts.

A method of controlling a molecular weight distribution and a molecular weight by using a dinuclear metallocene catalyst in a carrier has been proposed, but the method has a problem of low activity.

When a supported catalyst is prepared by mixing at least two metallocene catalysts so as to improve processability, a great difference in the molecular weight of the resin arises due to the two catalysts. Therefore, there is a problem that the molecular weight distribution is excessively wide or the difference in molecular weight is not shown, so that the level is not different from that of a single metallocene catalyst.

A metallocene catalyst that solves the above-described problems and has excellent processability and high activity without lowering mechanical strength is continuously required, and the improvement thereof is required.

DESCRIPTION OF EMBODIMENTS

Technical Problem

The present invention has been made in an effort to solve the above-described problems, and provides a polyolefin resin polymerized in the presence of a hybrid supported metallocene catalyst and having excellent activity and excellent processability due to a wide molecular weight distribution.

Another object of the present invention is provide a polyolefin resin polymerized in the presence of a hybrid supported metallocene catalyst capable of controlling a comonomer distribution and having excellent impact strength, flexural strength, and tensile strength in spite of a wide molecular weight distribution.

Another object of the present invention is to provide a polyolefin resin having excellent bubble stability and processing characteristics at the time of film processing and suitable for producing bottle caps, a containers, and the like.

Solution to Problem

In order to achieve the above-described objects of the present invention and achieve the characteristic effects of the present invention described below, the characteristic construction of the present invention is as follows.

According to one aspect of the present invention, there is provided a polyolefin resin prepared in the presence of a catalyst including at least one first metallocene compound represented by Formula 1, at least one second metallocene compound represented by Formula 2, and at least one cocatalyst compound.

[Formula 1]

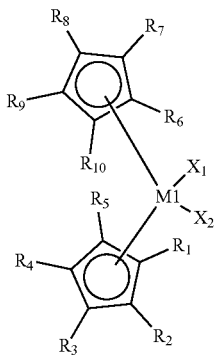

In Formula 1, M1 may be a group 4 transition metal of the periodic table of the elements, $X_1$ and $X_2$ may each independently be a halogen atom, a $C_1$-$C_{20}$ alkyl group, a $C_2$-$C_0$ alkenyl group, a $C_2$-$C_{20}$ alkynyl group, a $C_6$-$C_{20}$ aryl group, a $C_7$-$C_{40}$ alkylaryl group, a $C_7$-$C_{40}$ arylalkyl group, a $C_1$-$C_{20}$ alkylamido group, a $C_6$-$C_{20}$ arylamido group, or a $C_1$-$C_2$ alkylidene group, and $R_1$ to $R_{10}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$ to $C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring. Cyclopentadienyl linked to $R_1$ to $R_5$ and cyclopentadienyl linked to $R_6$ to $R_{10}$ may have the same structure or different structures. Since the respective cyclopentadienyls are not linked to each other through a bridge.

[Formula 2]

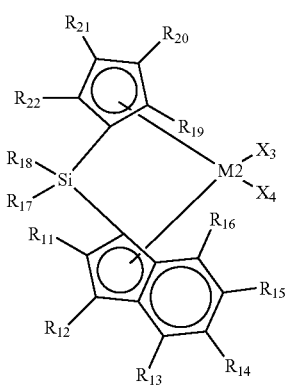

In Formula 2, M2 may be a group 4 transition metal of the periodic table of the elements, $X_3$ and $X_4$ may each independently be a halogen atom, a $C_1$-$C_{20}$ alkyl group, a $C_2$-$C_{20}$ alkenyl group, a $C_2$-$C_{20}$ alkynyl group, a $C_6$-$C_{20}$ aryl group, a $C_7$-$C_{40}$ alkylaryl group, a $C_7$-$C_{40}$ arylalkyl group, a $C_1$-$C_{20}$ alkylamido group, a $C_6$-$C_{20}$ arylamido group, or a $C_1$-$C_{20}$ alkylidene group, and $R_{11}$ to $R_{16}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$ to $C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring.

$R_{19}$ to $R_{22}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring.

$R_{17}$ and $R_{18}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring.

Indene linked to $R_{11}$ to $R_{16}$ and cyclopentadienyl linked to $R_{19}$ to $R_{22}$ have different structures, and indenyl and cyclopentadienyl are linked to silicon to form a bridge structure.

Advantageous Effects of Disclosure

When the hybrid supported metallocene catalyst of the present invention is polymerized in a single gas phase fluidized bed reactor, a melt flow rate ($MI_{21}/MI_2$) is larger than a resin prepared by using a metallocene catalyst, a melt flow rate ($MI_{21}/MI_2$) is smaller than a resin prepared by using a Ziegler-Natta catalyst, and a comonomer distribution is controlled by the hybrid supported metallocene catalyst.

Therefore, the polyolefin resin prepared by using the catalyst can control the comonomer distribution, the polyolefin resin has more excellent processability than that of a resin prepared by using a conventional metallocene catalyst, and has excellent characteristics in impact strength, flexural strength, tensile strength, and the like.

BRIEF DESCRIPTION OF DRAWINGS

FIG. 1 is a flowchart of a method for preparing a hybrid supported metallocene catalyst of Catalyst Preparation Example 9.

BEST MODE

The present invention will be described with reference to specific embodiments and the accompanying drawings. The embodiments will be described in detail in such a manner that the present invention may be easily carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment.

Therefore, the following detailed description is not intended as a limiting sense, and the scope of the present invention is limited only by the appended claims and the equivalents thereof, if properly described. In the drawings, like reference numerals refer to the same or similar functions throughout various aspects.

Hereinafter, embodiments of the present invention will be described with reference to the accompanying drawings, so that those of ordinary skill in the art can easily carry out the present invention.

A polyolefin resin according to the present invention may be polymerized by using a catalyst prepared by including a first metallocene compound, a second metallocene compound, and at least cocatalyst compound.

The first metallocene compound according to the present invention is represented by Formula 1 below and serves to improve the processability of a polymer prepared in a hybrid supported catalyst.

The first metallocene compound contains a transition metal and has two cyclopentadienyls coordinating with the transition metal (M1 in Formula 1). The cyclopentadienyl coordinated with the transition metal is referred to as a ligand. In the case of the first metallocene compound, as described below, cyclopentadienyl linked to R1 to R5 and cyclopentadienyl linked to R6 to R10 may have the same structure or different structures. The case of the same structure is referred to as a symmetrical structure with respect to the transition metal, and the case of the different structures is referred to as an asymmetric structure with respect to the transition metal. The coordination bond is a bond in which molecules or ions carrying an unshared electron pair provide an electron pair, and the molecules or ions providing the unshared electron pair are referred to as ligands.

Therefore, the first metallocene compound may be a compound having a symmetrical or asymmetric ligand since the ligands are identical to or different from each other, and may be a compound having a non-bridge structure since the ligands are not linked and thus a bridge is not formed.

Since the first metallocene compound is a compound having a non-bridge structure, the first metallocene compound forms a steric hindrance such that a comonomer hardly approaches a catalystic active site. Therefore, the mixing rate of the comonomer is low and a low-molecular-weight body is formed as compared with the second metallocene compound. A molecular weight distribution of a polymerized resin is increased to improve processability in processing the polymer.

In addition, since the mixing of the comonomer is low and the molecular weight is low as compared with the resin polymerized by the second metallocene compound, the resin polymerized by using the catalyst prepared by hybrid-supporting the first metallocene compound and the second metallocene compound may control a comonomer distribution.

[Formula 1]

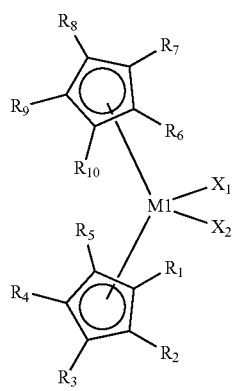

In Formula 1, M1 may be a group 4 transition metal of the periodic table of the elements, $X_1$ and $X_2$ may each independently be a halogen atom, a $C_1$-$C_{20}$ alkyl group, a $C_2$-$C_{20}$ alkenyl group, a $C_2$-$C_{20}$ alkynyl group, a $C_6$-$C_{20}$ aryl group, a $C_7$-$C_{40}$ alkylaryl group, a $C_7$-$C_{40}$ arylalkyl group, a $C_1$-$C_{20}$ alkylamido group, a $C_6$-$C_{20}$ arylamido group, or a $C_1$-$C_{20}$ alkylidene group, and $R_1$ to $R_{10}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$ to $C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring. Cyclopentadienyl linked to $R_1$ to $R_5$ and cyclopentadienyl linked to $R_6$ to $R_{10}$ may have the same structure or different structures. Since the respective cyclopentadienyls are not linked to each other, a compound having a non-bridge structure is formed.

Specifically, examples of the first metallocene compound represented by Formula 1 include transition metal compounds having the following structures and mixtures thereof, but the first metallocene compound is not limited thereto.

[Formula 1-1]

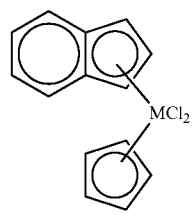

[Formula 1-2]

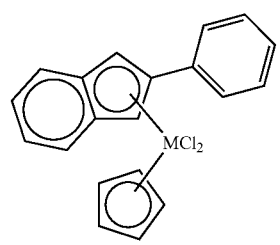

[Formula 1-3]

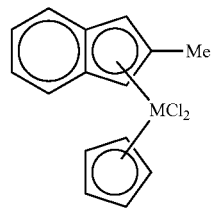

[Formula 1-4]

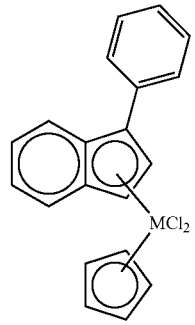

[Formula 1-5]

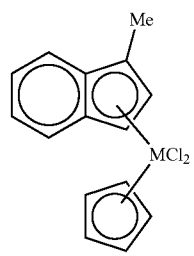

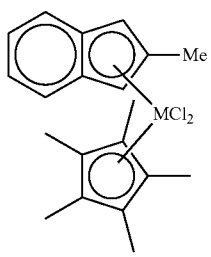
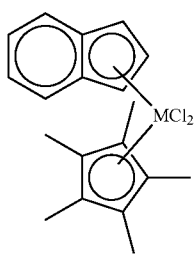
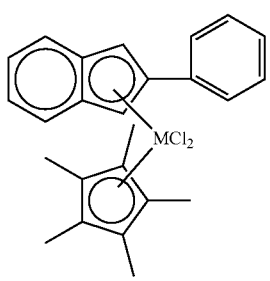
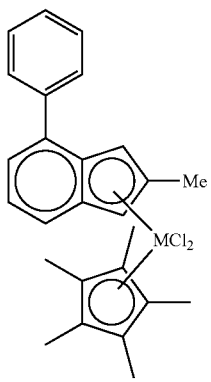
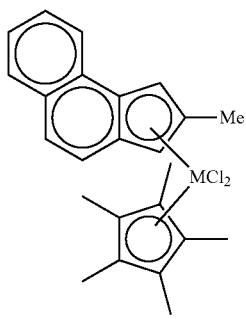
[Formula 1-6]
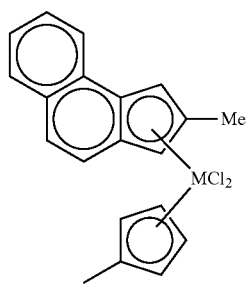
[Formula 1-7]
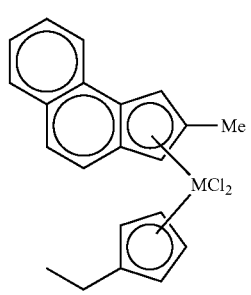
[Formula 1-8]
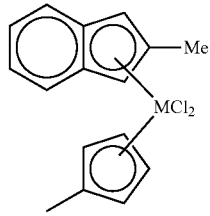
[Formula 1-9]
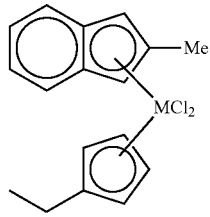
[Formula 1-10]
[Formula 1-11]
[Formula 1-12]
[Formula 1-13]
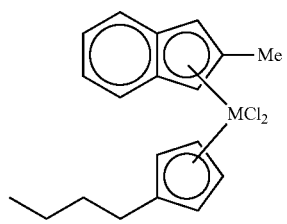
[Formula 1-14]
[Formula 1-15]
[Formula 1-16]
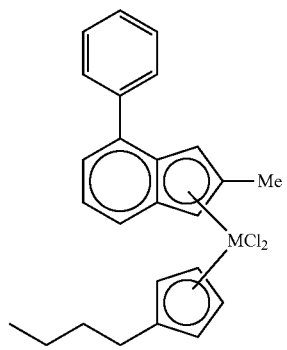

[Formula 1-17]

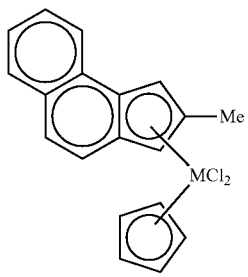

[Formula 1-18]

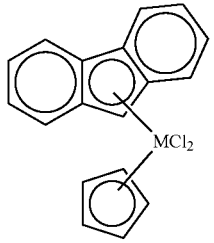

[Formula 1-19]

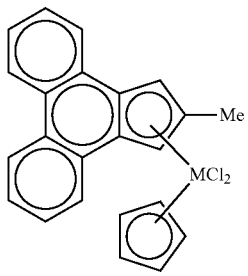

[Formula 1-20]

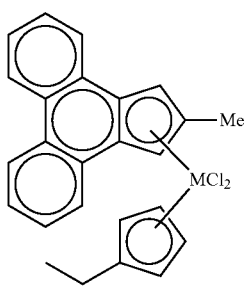

[Formula 1-21]

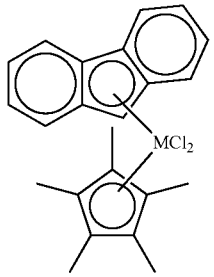

[Formula 1-22]

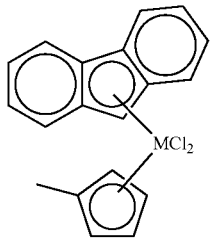

[Formula 1-23]

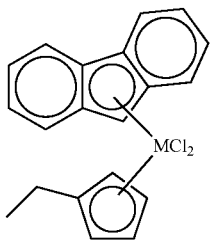

[Formula 1-24]

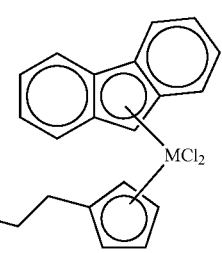

[Formula 1-25]

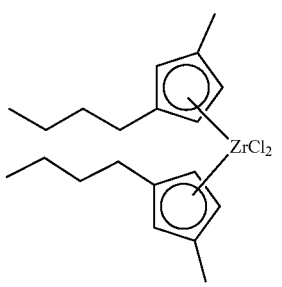

[Formula 1-26]

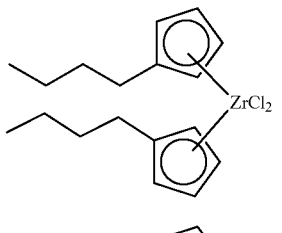

[Formula 1-27]

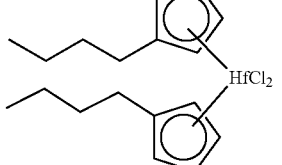

In the transition metal compounds, M is a group 4 transition metal of the periodic table of the elements, for example, hafnium (Hf), zirconium (Zr), or titanium (Ti), and Me is a methyl group. Compounds in which zirconium, hafnium, and the like of the above-described compounds are substituted with other group 4 transition metals fall within the scope of the present invention.

In addition, examples of the first metallocene compound may include [4-methylindenyl (cyclopentadienyl)]ZrCl$_2$, [indenyl (tetramethylcyclopentadienyl)]ZrCl$_2$, [2-methylindenyl (tetramethylcyclopentadienyl)]ZrCl$_2$, [2-methylbenzoindenyl (cyclopentadienyl)] ZrCl$_2$, and [4,5-benzodynyl (tetramethylcyclopentadienyl)]ZrCl$_2$, but the first metallocene compound is not limited thereto.

The second metallocene compound may be represented by Formula 2. The second metallocene compound serves to exhibit a high mixing rate of a comonomer at the hybrid supported catalyst, and serves to improve mechanical properties of a polymer prepared by synthesizing a high-molecular-weight body, as compared with compound 1.

The second metallocene compound contains a transition metal and has indenyl and cyclopentadienyl coordinating with the transition metal (M2 in Formula 2). The coordination bond is a bond in which molecules or ions carrying an unshared electron pair provide an electron pair, and the molecules or ions providing the unshared electron pair are referred to as ligands. In the case of the second metallocene compound, indenyl and cyclopentadienyl are ligands.

In addition, the respective ligands of the second metallocene compound are linked to Si to form a bridge. Thus, the second metallocene compound may be a compound having a bridge structure.

Since the ligands of the second metallocene compound have different structures, the second metallocene compound has an asymmetric ligand. However, the respective ligands are linked to each other, with Si interposed therebetween, to form a bridge structure. Therefore, a mixing rate of a comonomer is relatively higher than that of the first metallocene compound, a high-molecular-weight body is formed, and a comonomer distribution is relatively concentrated in the high-molecular-weight body. When the comonomer is concentrated in the high-molecular-weight body and has a uniform distribution, a large number of the molecules can be formed, thereby improving the impact strength, flexural strength, and environmental stress cracking resistance of the polymer.

The second metallocene compound is a bridge structure compound having an asymmetric structure and has a molecular weight distribution wider than that of the first metallocene compound, thereby increasing processability.

[Formula 2]

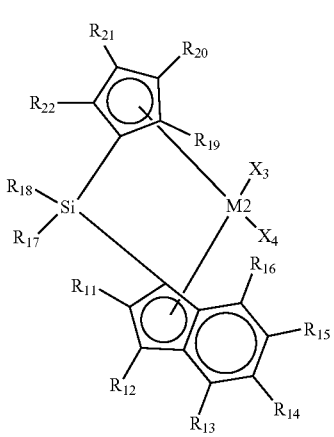

In Formula 2, M2 may be a group 4 transition metal of the periodic table of the elements, $X_3$ and $X_4$ may each independently be a halogen atom, a $C_1$-$C_{20}$ alkyl group, a $C_2$-$C_{20}$ alkenyl group, a $C_2$-$C_{20}$ alkynyl group, a $C_6$-$C_{20}$ aryl group, a $C_7$-$C_{40}$ alkylaryl group, a $C_7$-$C_{40}$ arylalkyl group, a $C_1$-$C_{20}$ alkylamido group, a $C_6$-$C_{20}$ arylamido group, or a $C_1$-$C_{20}$ alkylidene group, and $R_{11}$ to $R_{16}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$ to $C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring.

$R_{19}$ to $R_{22}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring.

$R_{17}$ and $R_{18}$ may each independently be a hydrogen atom, a substituted or unsubstituted $C_1$-$C_{20}$ alkyl group, a substituted or unsubstituted $C_2$-$C_{20}$ alkenyl group, a substituted or unsubstituted $C_6$-$C_{20}$ aryl group, a substituted or unsubstituted $C_7$-$C_{40}$ alkylaryl group, or a substituted or unsubstituted $C_7$-$C_{40}$ arylalkyl group, and may be linked to each other to form a ring.

Indene linked to $R_{11}$ to $R_{16}$ and cyclopentadienyl linked to $R_{19}$ to $R_{22}$ have different structures, and indenyl and cyclopentadienyl are linked to silicon to form a bridge structure.

Specifically, examples of the second metallocene compound represented by Formula 2 include transition metal compounds having the following structures and mixtures thereof, but the second metallocene compound is not limited thereto.

[Formula 2-1]

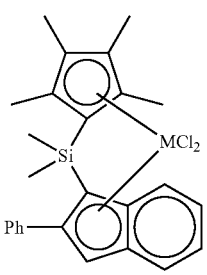

[Formula 2-2]

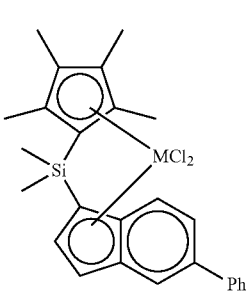

[Formula 2-3]

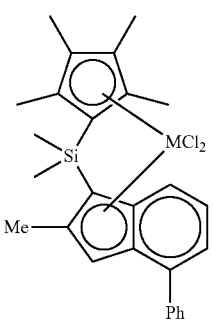

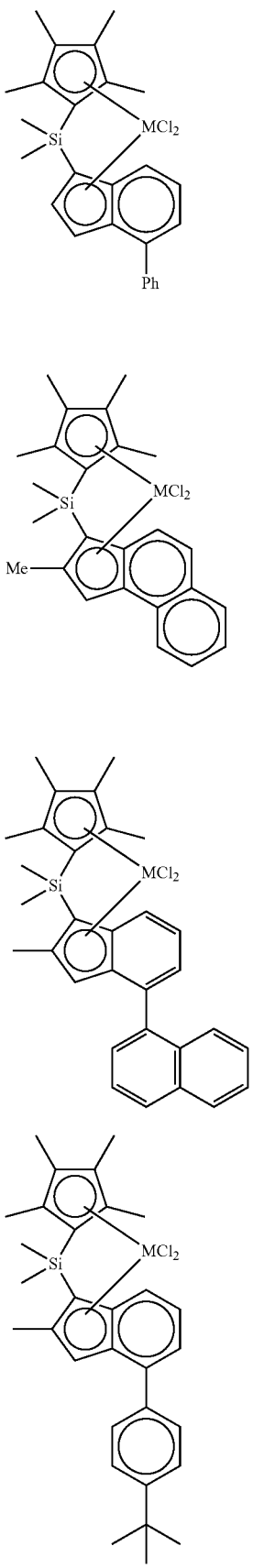

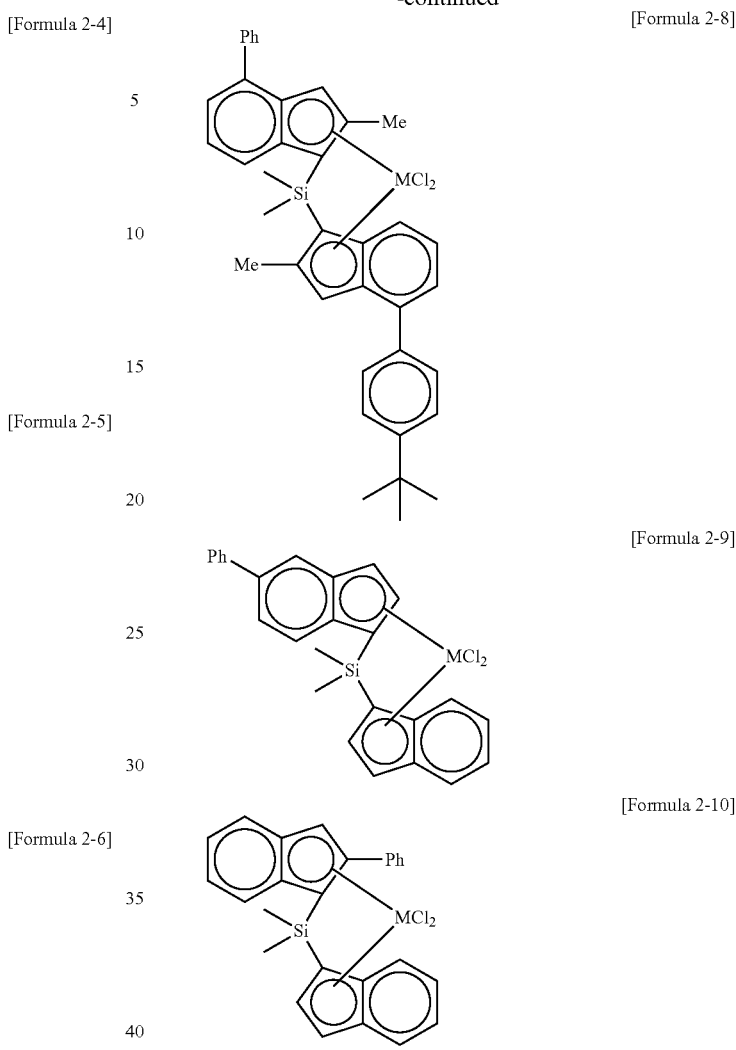

In the transition metal compounds, M is a group 4 transition metal of the periodic table of the elements, for example, hafnium (Hf), zirconium (Zr), or titanium (Ti), Me is a methyl group, and Ph is a phenyl group.

In addition, examples of the second metallocene compound may be dimethylsilyl {tetramethylcyclopentadienyl}{2-methyl-4-(4-tert-buthylphenyl)indenyl}ZrCl$_2$, dimethylsilyl(tetracyclopentadienyl)(2-methyl-4-phenylindenyl)ZrCl$_2$, and dimethylsilyl (tetramethylcyclopentadienyl)(4-phenylindenyl)ZrCl$_2$, but the second metallocene compound is not limited thereto.

In the preparation of the hybrid supported metallocene catalyst, as compared with the metallocene compound of the bridge structure which has the ligand of the symmetrical structure according to the present invention, the use of the second metallocene compound of Formula 2 having the bridge structure having the ligand of the asymmetric structure may have a controlled resin melt index, thereby maintaining mechanical properties while increasing processability.

A catalyst composition according to the present invention may include a transition metal compound such as the first metallocene compound and the second metallocene compound, and a cocatalyst compound including a compound represented by Formula 3, a compound represented by Formula 4, a compound represented by Formula 5 or 6, and mixtures thereof.

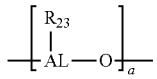

[Formula 3]

In Formula 3, AL is aluminum, $R_{23}$ is each independently a halogen atom, a $C_1$-$C_{20}$ hydrocarbon group, or a $C_1$-$C_{20}$ hydrocarbon group substituted with halogen, and a is an integer of 2 or more.

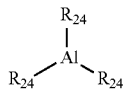

[Formula 4]

In Formula 4, Al is aluminum or boron, $R_{24}$ is each independently a halogen atom, a $C_1$-$C_{20}$ hydrocarbon group, a $C_1$-$C_{20}$ hydrocarbon group substituted with halogen, or a $C_1$-$C_{20}$ alkoxy group.

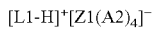

[Formula 5]

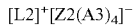

[Formula 6]

In Formulae 5 and 6, L1 and L2 are each independently neutral or cationic Lewis acids, Z1 and Z2 are each independently group 13 elements of the periodic table of the elements, for example, boron (B), aluminum (Al), gallium (Ga), or indium (in), and A2 and A3 are each independently a substituted or unsubstituted $C_6$-$C_{20}$ aryl group or a substituted or unsubstituted $C_1$-$C_{20}$ alkyl group.

The compound represented by Formula 3 is aluminoxane and is not particularly limited as long as the compound is general alkylaluminoxane.

For example, methylaluminoxane, ethylaluminoxane, isobutylaluminoxane, butylaluminoxane, and the like may be used. Specifically, methylaluminoxane may be used. The alkylaluminoxane may be prepared by a general method, such as a method of adding an appropriate amount of water to trialkylaluminum or a method of reacting trialkylaluminum with a hydrocarbon compound or an inorganic hydrate salt including water. Generally, the alkylaluminoxane is obtained in the form of a mixture of linear and cyclic aluminoxanes.

As the compound represented by Formula 4, for example, a general alkyl metal compound may be used.

Specifically, examples of the compound represented by Formula 4 may include trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tripentafluorophenylboron. More specifically, trimethylaluminum, triisobutylaluminum, and tripentafluorophenylboron may be used.

Examples of the compound represented by Formula 5 or 6 include methyldioctadecylammonium tetrakis(pentafluorophenyl)borate ([HNMe(C18H37)2]+[B(C6F5)4]-), trimethylammonium tetrakis(phenyl)borate, triethylammonium tetrakis(phenyl)borate, tripropylammonium tetrakis(phenyl)borate, tributylammonium tetrakis(phenyl)borate, trimethylammonium tetrakis(p-tolyl)borate, tripropylammonium tetrakis(p-tolyl)borate, trimethylammonium tetrakis(o,p-dimethylphenyl)borate, triethylammonium tetrakis (o,p-dimethylphenyl)borate, trimethylammonium tetrakis(p-trifluoromethylphenyl)borate, tributylammonium tetrakis(p-trifluoromethylphenyl)borate, tributylammonium tetrakis (pentafluorophenyl)borate, diethylammonium tetrakis (pentafluorophenyl)borate, triphenylphosphonium tetrakis (phenyl)borate, trimethylphosphonium tetrakis(phenyl)borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbenium tetrakis(p-trifluoromethylphenyl)borate, triphenylcarbenium tetrakis(pentafluorophenyl)borate, trimethylammonium tetrakis(phenyl)aluminate, triethylammonium tetrakis(phenyl)aluminate, tripropylammonium tetrakis(phenyl)aluminate, tributylammonium tetrakis(phenyl) aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl) aluminate, tributylammonium tetrakis(pentafluorophenyl) aluminate, N,N-diethylanilinium tetrakis(phenyl)aluminate, N,N-diethylanilinium tetrakis(phenyl)aluminate, N,N-diethylanilinium tetrakis(pentafluorophenyl)aluminate, diethylammonium tetrakis(pentafluorophenyl)aluminate, triphenylphosphonium tetrakis(phenyl)aluminate, trimethylphosphonium tetrakis(phenyl)aluminate, triethylammonium tetrakis(phenyl)aluminate, and tributylammonium tetrakis(phenyl)aluminate, but the present invention is not limited thereto. Specifically, methyldioctadecylammonium tetrakis(pentafluorophenyl)borate ([HNMe(C18H37) 2]+[B(C6F5)4]-), N,N-dimethylanilinium tetrakis(pentafluorophenyl)borate, and triphenylcarbenium tetrakis (pentafluorophenyl)borate may be used.

In the preparation of the hybrid supported metallocene catalyst according to the present invention, a ratio of a total mass of the transition metal of the first metallocene compound and the transition metal of the second metallocene compound to a mass of the carrier may be 1:1 to 1:1,000, and preferably 1:10 to 1:500. The transition metals indicate M1 of Formula 1 and M2 of Formula 2. When the ratio exceeds the above range, an appropriate supported catalyst activity is not exhibited and it is cost-ineffective.

In addition, a mass ratio of the cocatalyst compound represented by Formula 5 or 6 to the carrier is 1:20 to 20:1, and a mass ratio of the cocatalyst compound represented by Formula 3 or 4 to the carrier is 1:100 to 100:1, but the present invention is not limited thereto.

A mass ratio of the first metallocene compound to the second metallocene compound is preferably 1:100 to 100:1. When the cocatalyst and the metallocene compound are contained at the above-described mass ratio, it is advantageous in maintaining the activity of the catalyst and achieving cost reduction.

As a carrier suitable for the preparation of the hybrid supported metallocene catalyst according to the present invention, a porous material having a large surface area may be used.

The first and second metallocene compounds and the cocatalyst compound may be a supported catalyst that is hybrid-supported on the carrier and used as the catalyst. The supported catalyst means a catalyst that is well dispersed so as to improve catalyst activity and maintain stability and is supported on a carrier for stable maintenance.

The hybrid support refers to not supporting the first and second metallocene compounds on different carriers but supporting the catalyst compound on the carrier in one step. Due to the reduction in preparing time and the reduction in amount of a solvent used, the hybrid support may be said to be much more cost-effective than individual supports.

The carrier is a solid that disperses and stably retains a material having a catalytic function, and is usually a material having a large porosity or a large area so as to be highly dispersed and supported so as to increase the exposed surface area of the material having the catalytic function. The carrier should be stable mechanically, thermally, and chemically.

There is no limitation in the type of the carrier, and any materials may be used as long as the materials can be used as the carrier. Examples of the carrier may include silica, alumina, titanium oxide, zeolite, zinc oxide, starch, and synthetic polymer, but the present invention is not limited thereto The carrier may have an average particle size of 10 microns to 250 microns, preferably 10 microns to 150 microns, and more preferably 20 microns to 100 microns.

The carrier may have a microporous volume of 0.1 cc/g to 10 cc/g, preferably 0.5 cc/g to 5 cc/g, and more preferably 1.0 cc/g to 3.0 cc/g.

The carrier may have a specific surface area of 1 $m^2/g$ to 1,000 $m^2/g$, preferably 100 $m^2/g$ to 800 $m^2/g$, and more preferably 200 $m^2/g$ to 600 $m^2/g$.

In addition, when the carrier is silica, silica may have a drying temperature of 200° C. to 900° C. The drying temperature may be preferably 300° C. to 800° C., and more preferably 400° C. to 700° C. When the drying temperature is less than 200° C., too much moisture causes surface moisture to react with the cocatalyst. When the drying temperature exceeds 900° C., the structure of the catalyst collapses.

The hydroxyl group concentration in the dried silica may be 0.1 mmol/g to 5 mmol/g, preferably from 0.7 mmol/g to 4 mmol/g, and more preferably 1.0 mmol/g to 2 mmol/g. When the hydroxyl group concentration is less than 0.5 mmol/g, a supported amount of the cocatalyst is lowered. When the hydroxyl group concentration exceeds 5 mmol/g, the catalyst component is deactivated.

The hybrid supported metallocene catalyst according to the present invention may be prepared by activating the metallocene catalyst and supporting the activated metallocene catalyst on the carrier. In the preparation of the hybrid supported metallocene, the cocatalyst may be first supported on the carrier. The activation of the metallocene catalyst may be independently performed and may vary depending on the situation. As in the related art, after the cocatalyst is supported on the carrier, the first and second metallocene compounds may be supported. The first metallocene compound and the second metallocene compound may be mixed, activated with the cocatalyst, and then supported on the carrier. After the first metallocene compound is activated and supported, the second metallocene compound may be activated and support. The supporting order of the compounds may be changed.

Examples of the solvent of the reaction in the preparation of the hybrid supported metallocene catalyst include an aliphatic hydrocarbon solvent such as hexane or pentane, an aromatic hydrocarbon solvent such as toluene or benzene, a hydrocarbon solvent substituted with a chlorine atom, such as dichloromethane, an ether-based solvent such as diethyl ether or tetrahydrofuran, and most organic solvents such as acetone or ethyl acetate. Toluene or hexane is preferable, but the present invention is not limited thereto.

The reaction temperature in the preparation of the catalyst is 0° C. to 100° C., and preferably 25° C. to 90° C.

The reaction time in the preparation of the catalyst is 3 minutes to 48 hours, but the present invention is not limited thereto.

The metallocene compound may be activated by mixing (contacting) the cocatalyst compound. The mixing may be performed in an inert atmosphere, typically nitrogen or argon, without using a solvent, or in the presence of the hydrocarbon solvent.

The temperature in the activation of the first and second metallocene compounds may be 0° C. to 100° C., and preferably 10° C. to 30° C.

When the first and second metallocene compounds are activated with the cocatalyst compound, the stirring time may be 5 minutes to 24 hours, and preferably 30 minutes to 3 hours.

In the metallocene compound, the catalyst composition in a solution state, which is uniformly dissolved in the hydrocarbon solvent or the like, is used as it is. Alternatively, the metallocene compound may be used in a solid powder state in which the solvent is removed. However, the present invention is not limited thereto.

The method for preparing the polyolefin resin according to the present invention includes preparing a polyolefin homopolymer or copolymer by contacting the hybrid supported metallocene catalyst with at least one olefin monomer.

The method (polymerization reaction) for preparing the polyolefin resin according to the present invention may be a slurry phase or gas phase polymerization reaction. In addition, the respective polymerization reaction conditions may be variously modified according to the desired polymerization result of the polymerization method (slurry phase polymerization, gas phase polymerization) or the form of the polymer. The degree of the modification thereof may be easily performed by those of ordinary skill in the art.

When the polymerization is performed in a liquid phase or a slurry phase, a solvent or olefin itself may be used as a medium. Examples of the solvent may include propane, butane, pentane, hexane, octane, decane, dodecane, cyclopentane, methylcyclopentane, cyclohexane, methylcyclohexane, benzene, toluene, xylene, dichloromethane, chloroethane, dichloroethane, and chlorobenzene, and these solvents may be mixed at a predetermined ratio, but the present invention is not limited thereto.

Examples of the olefin monomer may include ethylene, α-olefins, and cyclic olefins, and preferably ethylene, propylene, 1-butene, 1-hexene, 1-octene, 1-decene, or mixtures thereof, but the present invention is not limited thereto.

The α-olefins include a $C_3$-$C_{12}$ (for example, $C_3$-$C_8$) aliphatic olefin. Specific examples of the α-olefins may include propylene, 1-butene, 1-pentene, 3-methyl-1-butene, 1-hexene, 4-methyl-1-pentene, 3-methyl-1-pentene, 1-heptene, 1-octene, 1-decene, 4,4-dimethyl-1-pentene, 4,4-diethyl-1-hexene, and 3,4-dimethyl-1-hexene, and the present invention is not limited thereto.

The α-olefins may be homopolymerized, or two or more olefins may be alternating, random, or block copolymerized. The copolymerization of the α-olefins may include copolymerization of ethylene and a $C_3$-$C_{12}$ (for example, $C_3$-$C_8$) α-olefin (specifically, ethylene and propylene, ethylene and 1-butene, ethylene and 1-hexene, ethylene and 4-methyl-1- pentene, ethylene and 1-octene, or the like) and copolymerization of propylene and a $C_4$-$C_{12}$ (for example, $C_4$-$C_8$) α-olefins (specifically, propylene and 1-butene, propylene and 4-methyl-1-pentene, propylene and 4-methyl-butene, propylene and 1-hexene, propylene and 1-octene, or the like). In the copolymerization of ethylene or propylene and another α-olefin, the amount of the other α-olefin may be 99 mol % or less of the total monomer, and generally, 80 mol % or less in the case of the ethylene copolymer.

In the method for preparing the polyolefin according to the present invention, the amount of the catalyst composition used is not particularly limited. For example, in the polymerization reaction system, the central metal (M, group 4 transition metal) represented by Formulae 1 and 2 may have a concentration of $1*10^{-5}$ mol/l to $9*10^{-5}$ mol/l.

In addition, the temperature and pressure at the time of polymerization may be changed according to the reactant, the reaction condition, and the like, and are thus not particularly limited. However, in the case of the slurry phase or gas phase polymerization, the polymerization temperature may be 0° C. to 120° C., and preferably 60° C. to 100° C.

In addition, the polymerization pressure may be 1 bar to 150 bar, and preferably 5 bar to 50 bar. The pressure may be applied by injecting an olefin monomer gas (for example, ethylene gas).

The polymerization may also be performed in two or more steps having different reaction conditions, and the molecular weight of the final polymer may be controlled by changing the polymerization temperature or injecting hydrogen into a reactor.

The polyolefin resin according to the present invention may be obtained by homopolymerization of ethylene or copolymerization of ethylene and α-olefin using the hybrid supported metallocene compound as a catalyst, and has a unimodal molecular weight distribution.

The polyolefin resin according to the present invention may be an ethylene-α-olefin copolymer.

The polyolefin resin may have a density of 0.910 g/cm³ to 0.960 g/cm³, a molecular weight distribution (Mw/Mn) of 3 to 5, an $MI_2$ (melt index) of 0.1 g/10 min to 100 g/10 min at 2.16 kg, and an $MI_{21}/MI_2$ of 20 to 40.

The hybrid supported metallocene catalyst according to the present invention exhibits excellent catalyst activity. When the polyolefin resin is prepared by using the hybrid supported metallocene catalyst according to the present invention, it is possible to prepare a polymer which has a wide unimodal molecular weight distribution and in which a comonomer is concentrated in a high-molecular-weight body.

Since the polyolefin resin is excellent in cutting strength, impact strength, and flexural strength, the polyolefin resin may be used for a film or blow molded produce.

Hereinafter, the structure and operation of the present invention will be described in more detail with reference to preferred examples of the present invention. However, these examples are shown by way of illustration and should not be construed as limiting the present invention in any way.

Since contents not described herein can be sufficiently technically inferred by those of ordinary skill in the art, descriptions thereof will be omitted.

EXAMPLES

Preparation Example 1 of First Metallocene Compound. Preparation of [Indenyl(cyclopentadienyl)]ZrCl$_2$ Indene (5 g, 0.043 mol) was dissolved in hexane (150 ml). The solution was sufficiently mixed and cooled to a temperature of −30° C. 2.5M n-butyllithium (n-BuLi) hexane solution (17 ml, 0.043 mol) was slowly dropped thereto and stirred at room temperature for 12 hours. A white suspension was filtered through a glass filter, and a white solid was sufficiently dried to obtain an indenyl lithium salt (yield: 99%).

In a slurry solution of the indenyl lithium salt (1.05 g, 8.53 mmol), (cyclopentadienyl)ZrCl$_3$ (2.24 g, 8.53 mmol) was slowly dissolved in ether (30 mL) and then cooled to a temperature of −30° C. An indenyl lithium salt dissolved in ether (15 mL) was slowly dropped to the ether solution and stirred for 24 hours to obtain [Indenyl (cyclopentadienyl)] ZrCl$_2$ (yield: 97%).

Preparation Example 2 of First Metallocene Compound. Preparation of [2-methyl benzeindenyl (cyclopentadienyl)]ZrCl$_2$

[2-methyl benzeindenyl (cyclopentadienyl)]ZrCl$_2$ (yield: 95%) was obtained in the same manner as in Preparation Example 1 by using 2-methylbenzeindienyl.

Preparation Example 3 of First Metallocene Compound. Preparation of [indenyl (tetramethylcyclopentadienyl)]ZrCl$_2$

[indenyl (tetramethylcyclopentadienyl)]ZrCl$_2$ (yield: 93%) was obtained in the same manner as in Preparation Example 1 by using indenyl and tetrametylcyclopentadienyl.

Preparation Example 4 of First Metallocene Compound. Preparation of [2-methyl benzeindenyl (tetramethylcyclopentadienyl)]ZrCl$_2$

[2-methyl benzeindenyl (tetramethylcyclopentadienyl)] ZrCl$_2$ (yield: 92%) was obtained in the same manner as in Preparation Example 1 by using 2-methylbenzeindienyl and tetramethylcyclopentadienyl.

Preparation Example 5 of Second Metallocene Compound. Preparation of Me$_2$Si(tetramethylcyclopentadienyl)(2-phenylindenyl)ZrCl$_2$ Tetramethylcyclopentadienyl Li salt (13 g, 1 eq) was added to THF (450 mL) and stirred. After the temperature of the solution was cooled to a temperature of 0° C., Me$_2$SiCl$_2$ (32.73 g, 1 eq) was added thereto. The solution was gradually heated to room temperature. After the reaction for 12 hours, tetrahydrofuran (THF) was removed therefrom under vacuum, and Li salt was removed therefrom through extraction using pentane. Pentane was removed from the solution to obtain a yellow oil, i.e., dimethylsilyl(tetramethylcyclopentadienyl)chloride (19.6 g, 90%).

2-phethylindenylyl lithium (325 mg, 1 eq) and THF (10 mL) solution was slowly added to dimethylsilyl(tetramethylcyclopentadienyl)chloride (300 mg, 1 eq) and THF (5 mL) solution at a temperature of −30° C., and the solution was gradually heated to room temperature and stirred for 12 hours. THF was removed therefrom under vacuum, and Li salt was removed therefrom through extraction using pentane. Pentane was dried in the remaining solution to obtain a ligand (403 mg, 72%).

n-BuLi (0.96 g, 2.2 eq, 1.6M in hexane) was slowly added to a solution in which dimethylsilyl(2-phenylindenyl)(tetramethylcyclopentadienyl) (380 mg) was dissolved in hexane (15 ml) at a temperature of −30° C., and the solution was gradually heated to room temperature and stirred for 12 hours. Then, the solution was slowly added to a suspension in which $ZrCl_4$ (232 mg) and ether (11.4 ml) were mixed at a temperature of −30° C., gradually heated to room temperature, and stirred for 10 minutes. After the reaction was completed, all the solvents were removed therefrom under vacuum, and a product obtained therefrom was extracted with toluene, filtered, and recrystallized to obtain a yellow solid (209 mg, 40%).

Preparation Example 6 of Second Metallocene Compound. Preparation of $Me_2Si\{tetramethylCp\}\{2-methyl-4-(4-t-butylphenyl)Ind\}ZrCl_2$ $Me_2Si\{tetramethylcyclopentadienyl\}\{2-methyl-4-(4-t-butylphenyl)Indenyl\}ZrCl_2$ (yield: 72%) was obtained in the same manner as in Preparation Example 5 by using 2-methyl-4-(4-t-butylphenyl)Indenyl as a ligand.

Preparation Example 7 of Second Metallocene Compound. Preparation of $Me_2Si(tetramethylCyclopentadienyl)(2-methyl-4-phenylIndenyl)ZrCl_2$ Preparation Example 7-1 of Second Metallocene Compound. Preparation of Ligand Compound 2-methyl-7-Phenyl-1H-indenyl Diethyl 2-methylmalonate (17.5 g, 1 eq) was slowly added to a solution in which NaH (60 wt % in mineral oil, 4.42 g, 1.1 eq) was dispersed in THF (80 mL) at a temperature of −30° C., and then stirred for 1 hour. 2-bromobenzyl bromide (26.36 g, 1.05 eq) dissolved in THF (10 mL) was added at a temperature of 0° C. for 1 hour and stirred under reflux for 12 hours. A product obtained therefrom was filtered and a solvent was dried to obtain a yellow oil 2-(2-bromobenzyl)-2-methylmalonate (34 g, 99%).

Diethyl 2-(2-bromobenzyl)-2-methylmalonate (34.5 g, 1 eq), sodium Hydroxide (22.5 g, 4 eq), methanol (110 ml), and water (110 ml) were added and stirred under reflux for 12 hours. A solid obtained therefrom was filtered, dissolved with MeOH, and dried under vacuum to obtain a white solid 2-(2-bromobenzyl)-2-methylmalonic acid (28.1, 97%). The white solid was heated under reflux in the air at a temperature of 150° C. for 4 hours to obtain a dark yellow oil 3-(2-bromophenyl)-2-methylpropanoic acid (23.25 g, 97%)

MC (1 mL) and thionyl chloride (1.1 g, 1.1 eq) were added to 3-(2-bromophenyl)-2-methylpropanoic acid (2 g, 1 eq) and stirred at a temperature of 40° C. for 12 hours. A product obtained therefrom was vacuum-dried to obtain a dark yellow oil 3-(2-bromophenyl)-2-methylpropanoyl chloride (LS37-1) (1.6 g, 97%)

3-(2-bromophenyl)-2-methylpropanoyl chloride (1.6 g, 1 eq) synthesized as described above was slowly added to a solution in which $AlCl_3$ (1.2 g, 1.2 eq) was dispersed in MC (14 mL) at a temperature of 0° C. for 1 hour, and the solution was heated and stirred under reflux for 3 hours. A product obtained therefrom was filtered and a solvent was dried to obtain a colorless solid 4-bromo-2-methyl-1-indanone (1.6 g, 92%).

4-bromo-2-methyl-1-indanone (1.6 g, 1 eq) was dissolved in methanol (20 ml), and sodium borohydride (268 mg, 1 eq) was added thereto at a temperature of 0° C. for 30 minutes. After the reaction was completed, a solvent was dried to obtain a yellow liquid 4-bromo-2-methyl-1-indanol (1.55 g, 97%).

4-bromo-2-methyl-1-indanol (1.56 g, 1 eq), toluene (50 mL), and p-toluenesulfonic acid monohydrate (7 mg, 0.005 eq) were added and stirred at a temperature of 110° C. for 1 hour. After the reaction was completed, toluene was removed therefrom under vacuum to obtain a brown oil 4-bromo-2-methylindenyl (1.23 g, 85%).

4-bromo-2-methylindenyl (4.16 g, 1 eq) and $Ni(dppp)Cl_2$ (216 mg, 0.02 eq) were added to ether (50 mL), and PhMgBr (8.23 g, 1.1 eq, 3.0M in ether) was added thereto at a temperature of 0° C. for 1 hour. The solution was gradually heated to room temperature and stirred under reflux at a temperature of 50° C. for 12 hours. After the reaction was completed, the reaction product was filtered and a solvent was dried to obtain a white solid 2-methyl-7-phenyl-1H-indenyl (4 g, 90%).

Preparation Example 7-2 of Second Metallocene Compound. Preparation of Dimethylsilyl(2-methyl-4-phenylindenyl)(tetramethylcyclopentadienyl)Zirconiumdichloride Dimethylsilyl(2-methyl-4-phenylindenyl)(tetramethylcyclopentadienyl)zirconium dichloride (62%) was obtained in the same manner as in Preparation Example 5, except that 2-methyl-7-phenyl-1H-indenyl was used instead of 2-phenylindenyl.

Preparation Example 8 of Second Metallocene Compound. Preparation of $Me_2Si(tetramethylCyclopentadienyl)(4-phenylIndenyl)ZrCl_2$ Preparation Example 8-1 of Second Metallocene Compound. Preparation of Ligand Compound 7-phenyl-1H-indenyl 7-bromo-1H-indenyl (5.26 g, 1 eq), Pd(PPh3)4 (1.56 g, 0.05 eq), and phenylboronic acid (4.27 g, 1.3 eq) were added to a solution of THF and MeOH (4:1, 100 mL), and $K_2CO_3$ aqueous solution (2.0M, 3.3 eq) was added thereto at room temperature. The solution was stirred under reflux at a temperature of 80° C. for 12 hours. A product obtained therefrom was filtered and a solvent was dried to obtain a light yellow solid 7-phenyl-1H-indenyl (4.66 g, 90%).

Preparation Example 8-2 of Second Metallocene Compound. Preparation of Dimethylsilyl(4-phenylindenyl)(tetramethylcyclopentadienyl)Zirconiumdichloride Dimethylsilyl(4-phenylindenyl)(tetramethylcyclopentadienyl)zirconium dichloride (yield: 61%) was prepared in the same manner as in Preparation Example 5, except that 7-phenyl-1H-indenyl was used instead of 2-phenylindenyl.

Preparation Example 9 of Hybrid Supported Metallocene Catalyst

The first and second metallocene compounds and methylaluminoxane (MAO) as the cocatalyst lost activity when reacting with moisture or oxygen in the air. Therefore, all experiments were performed under a nitrogen condition by using a glove box and a Schlenk technique. A 200 mL supported catalyst reactor was washed to remove foreign matter therefrom. The reactor was dried at a temperature of 110° C. for 3 hours. A catalyst compound was added thereto in the glove box, and the reactor was closed and then used.

10 wt % of methylalumoxane (MAO) solution (methylaluminoxane: 18.74 g) was added to 0.030 g of the compound prepared in Preparation Example 1 of First Metallocene Compound and 0.070 g of the compound prepared in Preparation Example 5 of Second Metallocene Compound, and the mixture was stirred at room temperature for 1 hour. After 5 g of silica (XPO2402) was added to the reactor, 30 mL of purified toluene was added to the reactor and then stirred. After the stirring step for 1 hour was completed, a mixed solution of a first metallocene compound, a second metallocene compound, and methylaluminoxane was added to the reactor while stirring the reactor. The reactor was heated to a temperature of 60° C. and stirred for 2 hours. After a precipitation reaction, a supernatant was removed, washed with 1 L of toluene, and vacuum-dried at a temperature of 60° C. for 12 hours.

Preparation Example 10 of Hybrid Supported Metallocene Catalyst

A hybrid supported metallocene catalyst was prepared in the same manner as in Preparation Example 9, except that 0.031 g of the compound prepared in Preparation Example 2 of First Metallocene Compound and 0.070 g of the compound prepared in Preparation Example 5 of Second Metallocene Compound were used.

Preparation Example 11 of Hybrid Supported Metallocene Catalyst

A hybrid supported metallocene catalyst was prepared in the same manner as in Preparation Example 9, except that 0.036 g of the compound prepared in Preparation Example 3 of First Metallocene Compound and 0.070 g of the compound prepared in Preparation Example 5 of Second Metallocene Compound were used.

Preparation Example 12 of Hybrid Supported Metallocene Catalyst

A hybrid supported metallocene catalyst was prepared in the same manner as in Preparation Example 9, except that 0.037 g of the compound prepared in Preparation Example 4 of First Metallocene Compound and 0.070 g of the compound prepared in Preparation Example 5 of Second Metallocene Compound were used.

Preparation Example 13 of Hybrid Supported Metallocene Catalyst

A hybrid supported metallocene catalyst was prepared in the same manner as in Preparation Example 9, except that 0.038 g of the compound prepared in Preparation Example 1 of First Metallocene Compound and 0.066 g of the compound prepared in Preparation Example 6 of Second Metallocene Compound were used.

Preparation Example 14 of Hybrid Supported Metallocene Catalyst

A hybrid supported metallocene catalyst was prepared in the same manner as in Preparation Example 9, except that 0.047 g of the compound prepared in Preparation Example 4 of First Metallocene Compound and 0.066 g of the compound prepared in Preparation Example 6 of Second Metallocene Compound were used.

Preparation Example 15 of Hybrid Supported Metallocene Catalyst

A hybrid supported metallocene catalyst was prepared in the same manner as in Preparation Example 9, except that 0.03 g of the compound prepared in Preparation Example 1 of First Metallocene Compound and 0.072 g of the compound prepared in Preparation Example 7-2 of Second Metallocene Compound were used.

Preparation Example 16 of Hybrid Supported Metallocene Catalyst

A hybrid supported metallocene catalyst was prepared in the same manner as in Preparation Example 9, except that 0.031 g of the compound prepared in Preparation Example 2 of First Metallocene Compound and 0.072 g of the compound prepared in Preparation Example 7-2 of Second Metallocene Compound were used.

Preparation Example 17 of Hybrid Supported Metallocene Catalyst

A hybrid supported metallocene catalyst was prepared in the same manner as in Preparation Example 9, except that 0.031 g of the compound prepared in Preparation Example 2 of First Metallocene Compound and 0.079 g of the compound prepared in Preparation Example 6 of Second Metallocene Compound were used.

Preparation Example 18 of Hybrid Supported Metallocene Catalyst

A hybrid supported metallocene catalyst was prepared in the same manner as in Preparation Example 9, except that 0.036 g of the compound prepared in Preparation Example 3 of First Metallocene Compound and 0.079 g of the compound prepared in Preparation Example 6 of Second Metallocene Compound were used.

Preparation Example 19 of Hybrid Supported Metallocene Catalyst

A hybrid supported metallocene catalyst was prepared in the same manner as in Preparation Example 9, except that 0.072 g of the compound prepared in Preparation Example 7-2 of Second Metallocene Compound and 0.036 g of (n-Bu-cyclopentadienyl)$_2$ZrCl$_2$ were used.

Preparation Example 20 of Hybrid Supported Metallocene Catalyst

A hybrid supported metallocene catalyst was prepared in the same manner as in Preparation Example 9, except that 0.036 g of (n-Bu-cyclopentadienyl)$_2$ZrCl$_2$ and 0.079 g of the compound prepared in Preparation Example 6 of Second Metallocene Compound were used.

Example 1

50 mg of the hybrid supported metallocene catalyst obtained in Preparation Example 9 was polymerized in a 2 L autoclave reactor at a polymerization temperature of 80° C., 50 mL of 1-hexene, and an ethylene partial pressure of 14 kg/cm$^2$ for 1 hour to obtain 124 g of polyethylene.

Example 2

Polyethylene was prepared in the same manner as in Example 1, except that the hybrid supported metallocene catalyst obtained in Preparation Example 10 was used.

Example 3

Polyethylene was prepared in the same manner as in Example 1, except that the hybrid supported metallocene catalyst obtained in Preparation Example 11 was used.

Example 4

Polyethylene was prepared in the same manner as in Example 1, except that the hybrid supported metallocene catalyst obtained in Preparation Example 12 was used.

Example 5

Polyethylene was prepared in the same manner as in Example 1, except that the hybrid supported metallocene catalyst obtained in Preparation Example 13 was used.

Example 6

Polyethylene was prepared in the same manner as in Example 1, except that the hybrid supported metallocene catalyst obtained in Preparation Example 14 was used.

Example 7

Polyethylene was prepared in the same manner as in Example 1, except that the hybrid supported metallocene catalyst obtained in Preparation Example 15 was used.

Example 8

Polyethylene was prepared in the same manner as in Example 1, except that the hybrid supported metallocene catalyst obtained in Preparation Example 16 was used.

Example 9

Polyethylene was prepared in the same manner as in Example 1, except that the hybrid supported metallocene catalyst obtained in Preparation Example 17 was used.

Example 10

Polyethylene was prepared in the same manner as in Example 1, except that the hybrid supported metallocene catalyst obtained in Preparation Example 18 was used.

Example 11

Polyethylene was prepared in the same manner as in Example 1, except that the hybrid supported metallocene catalyst obtained in Preparation Example 19 was used.

Example 12

Polyethylene was prepared in the same manner as in Example 1, except that the hybrid supported metallocene catalyst obtained in Preparation Example 20 was used.

Comparative Example 1

10 wt % of methylalumoxane (MAO) solution (methylaluminoxane: 18.8 g) was added to 0.117 g of the compound prepared in Preparation Example 5 of Second Metallocene Compound, and the mixture was stirred at room temperature for 1 hour. After 5 g of silica (XPO2402) was added to the reactor, 30 mL of purified toluene was added to the reactor and then stirred. After the stirring step for 1 hour was completed, a mixed solution of a metallocene compound and methylaluminoxane was added to the reactor while stirring the reactor. The reactor was heated to a temperature of 60° C., stirred for 2 hours, washed, and dried to prepare a supported catalyst. A polymerization reaction was performed in the same manner as in Example 1, except that 50 mL of 1-hexene was added.

Comparative Example 2

A supported catalyst was prepared in the same manner as in Comparative Example 1, except that 0.133 g of the compound prepared in Preparation Example 1 of First Metallocene Compound was used, and a polymerization was performed in the same manner as in Example 1.

Comparative Example 3

A supported catalyst was prepared in the same manner as in Comparative Example 1, except that 0.092 g of Et(Ind)$_2$ZrCl$_2$ was used, and a polymerization was performed in the same manner as in Example 1.

Comparative Example 4

A supported catalyst was prepared in the same manner as in Preparation Example 9, except that 0.055 g of Et(Ind)$_2$ZrCl$_2$ and 0.030 g of the compound prepared in Preparation Example 1 was used, and a polymerization was performed in the same manner as in Example 1.

Comparative Example 5

A supported catalyst was prepared in the same manner as in Comparative Example 1, except that 0.115 g of bis(1.3-Me, BuCp)ZrCl$_2$ was used.

<Physical Property Measurement Method 1>

1) A density was measured according to ASTM 1505.

2) A melt index (MI$_2$, 2.16 kg) was an amount of extrusion for 10 minutes at a load of 2.16 kg, and was measured at a measurement temperature of 190° C. according to ASTM 1238.

3) Melt flow rate MI$_{21}$/MI$_2$): A ratio obtained by dividing a flow index (MI$_{21}$, load of 21.6 kg) by a melt index (MI$_2$, load of 2.16 kg) The melt flow rate may indicate a molecular weight distribution and processability.

4) Melt fracture occurrence rpm: A Gottfert machine was used to compare rpm at which melt fracture occurred on a surface of a resin.

The ASTM is the name of the standard and is divided into 1) definition of common terms in the field, 2) sequence that is considered to be appropriate so as to achieve a given task, 3) method for making a given measurement, 4) criteria for dividing objects or concepts into groups, 5) determining the range or limitation of characteristics of a product or material.

In addition, the MI$_2$, i.e., melt index, is a term indicating melt flowability of a plastic material having a predetermined load at a predetermined temperature. As the melt index is higher, the processability of the polymer is more excellent. The melt index is inversely proportional to the molecular weight. A polyolefin resin may be prepared by various molding methods, but these methods are common in that the resin is first heated to a molten state and then molded. Therefore, the melting property is an extremely important physical property in the molding of the polyolefin-based resin. In particular, in the molding such as extrusion molding, compression molding, injection molding, or rotational molding, the melting property, that is, the melt flowability, is an essential property that affects satisfactory moldability. As the melt flow index is larger, the flow becomes easier.

The melt fracture is a phenomenon in which irregular concave blocks are formed on the surface of the plastic product, or the gloss of the surface is lost, if the internal pressure of the extruder is extremely high, the extrusion speed is extremely high, or the temperature of the plastic material is too low at the time of extrusion.

Therefore, in the case of the physical property measurement method 4, processability is more excellent as the measured melt fracture occurrence rpm is higher.

The measured physical properties of the polyolefins of Examples 1 to 12 and Comparative Examples 1 to 5 are shown in Table 1.

TABLE 1

| | Catalyst Activity (gPE/gCat) | MI2.16 (g/10 min) | MI21.6/MI2.16 | Density (g/cc) |
|---|---|---|---|---|
| Example 1 | 2480 | 0.47 | 37 | 0.9195 |
| Example 2 | 2230 | 0.32 | 35 | 0.9201 |
| Example 3 | 2760 | 0.17 | 28 | 0.9248 |
| Example 4 | 1350 | 0.64 | 32 | 0.9251 |
| Example 5 | 3700 | 0.34 | 42 | 0.9257 |
| Example 6 | 2900 | 0.45 | 37 | 0.9264 |
| Example 7 | 4500 | 0.24 | 41 | 0.9218 |
| Example 8 | 4230 | 0.37 | 48 | 0.9301 |
| Example 9 | 3900 | 0.23 | 40 | 0.9275 |
| Example 10 | 2530 | 0.14 | 34 | 0.9281 |
| Example 11 | 4170 | 0.21 | 37 | 0.9254 |
| Example 12 | 4300 | 0.19 | 43 | 0.9263 |
| Comparative Example 1 | 2520 | ND | — | 0.9229 |
| Comparative Example 2 | 3440 | 0.49 | 19 | 0.9268 |
| Comparative Example 3 | 5400 | 0.035 | 146 | 0.9214 |
| Comparative Example 4 | 2360 | 0.099 | 75 | 0.9257 |
| Comparative Example 5 | 2800 | 0.133 | 25 | 0.9244 |

The examples are the polymers polymerized by using the catalyst prepared by hybrid-supporting the first metallocene compound of the non-bridge structure having the ligand of the symmetrical or asymmetric structure and the second metallocene compound having the bridge structure having the ligand of the asymmetric structure on the carrier. Comparative Examples 1 to 3 and 5 are each independently the polymers polymerized by using the catalyst prepared by supporting the single metallocene compound on the carrier. Comparative Example 4 is the polymer polymerized by using the catalyst prepared by hybrid-supporting the metallocene compound of the bridge structure having the ligand of the symmetrical structure and the metallocene compound of the non-bridge structure having the ligand of the asymmetric structure on the carrier.

From Table 1, the metallocene catalyst in which the first metallocene compound of Formula 1 and the second metallocene compound of Formula 2 are hybrid-supported has a larger melt flow rate ($MI_{21}/MI_2$) than the resin polymerized by using the single metallocene compound of the non-bridge structure having the ligand of the asymmetric structure in Comparative Example 2 and the resin polymerized by using the single metallocene compound of the non-bridge structure having the ligand of the symmetrical structure in Comparative Example 5, and has a smaller melt flow rate ($MI_{21}/MI_2$) than the resin polymerized by using the single metallocene compound of the bridge structure having the ligand of the symmetrical structure in Comparative Example 3.

In addition, when compared with Comparative Example 4 in which the polymerization is performed by the catalyst in which the compound of the non-bridge structure and the compound of the bridge structure having the ligand of the symmetrical structure are hybrid-supported, the polymerized resins of Examples have a small melt flow rate ($MI_{21}/MI_2$). That is, the metallocene compounds of the bridge structure having the ligand of the asymmetric structure (Examples 1 to 12) has a smaller melt flow rate ($MI_{21}/MI_2$) than the metallocene compound of the bridge structure having the symmetrical ligand (Comparative Example 4). Therefore, it can be seen that mechanical strength of the resin will be high. The melt flow rate ($MI_{21}/MI_2$) is appropriately controlled by hybrid-supporting the metallocene compound of the non-bridge structure on the carrier, thereby obtaining desired mechanical properties and processability.

Preparation Example 21 of Hybrid Supported Metallocene Catalyst

A 10 L supported catalyst reactor was washed to remove foreign matter therefrom. The reactor was closed while drying at a temperature of 110° C. for 3 hours or more, and was then used in a state in which moisture or the like was completely removed using a vacuum.

10 wt % of methylalumoxane (MAO) solution (methylaluminoxane: 1,122 g) was added to 2.13 g of the compound prepared in Preparation Example 1 of First Metallocene Compound and 3.305 g of the compound prepared in Preparation Example 6 of Second Metallocene Compound, and the mixture was stirred at room temperature for 1 hour. After 300 g of silica (XPO2402) was added to the reactor, 2,000 mL of purified toluene was added to the reactor and then stirred. After the step of stirring the metallocene compound for 1 hour was completed, a mixed solution of a first metallocene compound, a second metallocene compound, and methylaluminoxane was added to the reactor while stirring the reactor to which silica was added. The reactor was heated to a temperature of 70° C. and stirred for 2 hours. After a precipitation reaction, a supernatant was removed, washed with 1 L of toluene, and vacuum-dried at a temperature of 60° C. for 12 hours.

Example 13

An olefin polymer was prepared by adding the obtained hybrid supported metallocene catalyst to a fluidized bed gas continuous pilot polymerizer. 1-hexene was used as a comonomer, a reactor ethylene pressure was maintained at 15 bar, a polymerization temperature was maintained at 80° C. to 90° C. and a superficial gas velocity was maintained at 55 cm/s.

Comparative Example 6

A 10 L supported catalyst reactor was washed to remove foreign matter therefrom. The reactor was closed while drying at a temperature of 110° C. for 3 hours or more, and was then used in a state in which moisture or the like was completely removed using a vacuum.

10 wt % of methylalumoxane (MAO) solution (methylaluminoxane: 1,130 g) was added to 6.92 g of bis(1,3-Me, BuCp)ZrCl$_2$, and the mixture was stirred at room temperature for 1 hour. After 300 g of silica (XPO2402) was added to the reactor, 2,000 mL of purified toluene was added to the reactor and then stirred. After the stirring step for 1 hour was completed, a mixed solution of a metallocene compound and methylaluminoxane was added to the reactor while stirring the reactor. The reactor was heated to a temperature of 60° C. and stirred for 2 hours. After a precipitation reaction, a supernatant was removed, washed with 2 L of toluene, and vacuum-dried at a temperature of 60° C. for 12 hours or more.

An olefin polymer was prepared by adding the obtained hybrid supported metallocene catalyst to a fluidized bed gas continuous pilot polymerizer. 1-hexene was used as a comonomer, a reactor ethylene pressure was maintained at 15 bar, a polymerization temperature was maintained at 80° C. to 90° C. and a superficial gas velocity was maintained at 55 cm/s.

<Physical Property Measurement Method 2>

1) A density was measured according to ASTM 1505.

2) A melt index ($MI_2$, 2.16 kg) was an amount of extrusion for 10 minutes at a load of 2.16 kg, and was measured at a measurement temperature of 190° C. according to ASTM 1238.

3) Melt flow rate $MI_{21}/MI_2$: A ratio obtained by dividing a flow index ($MI_{21}$, load of 21.6 kg) by a melt index ($MI_2$, load of 2.16 kg) The melt flow rate may indicate a molecular weight distribution and processability.

4) Melt fracture occurrence rpm: A Gottfert machine was used to compare rpm at which melt fracture occurred on a surface of a resin.

5) Tensile strength was measured according to ASTM D638.

6) Rheological property (shear thinning power) was measured by using an ARES rheometer.

In the above-described physical property measurement method, a bar-shaped specimen is pulled and tensile strength is calculated from the applied load and the deformed shape of the specimen. When a load is applied to the specimen, the specimen is stretched in proportion to the load, and deviates from the proportional relationship. The tensile strength is a value obtained by dividing a maximum load by an original cross-sectional area of the specimen at any stretching value, and the tensile strength indicates the maximum load that can be sustained in a unit area. In the examples according to the present invention, the physical properties were measured twice. That is, the tensile strength at the time of pulling 50 mm per minute and the tensile strength at the time of pulling 200 mm per minute were measured.

In addition, in the rheological property measurement, rheological properties are physical properties related to a material's flow and deformation. The flow and deformation experienced by the material in the product production process have a decisive influence on the characteristics of the product. The unique properties appearing when the material undergoes the flow and deformation are the rheological properties. A method for measuring the rheological properties obtains a material function by measuring stress appearing when strain is applied. The above-described ARES rheometer is a device for measuring shear thinning power while controlling a shear rate. Shear thinning is a physical property that is mainly applied due to the properties of the polymer, and means a fluid whose viscosity decreases as a shear rate increases in non-Newtonian fluids whose viscosity is affected by a shear rate.

The measured physical properties of the polyolefins of Example 13 and Comparative Example 6 according to the measurement method are shown in Table 2.

TABLE 2

|  | Example 13 | Comparative Example 6 |
|---|---|---|
| Ethylene Pressure (kg/cm²) | 15.0 | 15.1 |
| Hydrogen/Ethylene mole ratio (%) | 0.037 | 0.022 |
| 1-hexene/ethylene mole ratio (%) | 0.34 | 0.63 |
| Catalyst Activity (gPE/gCat) | 3500 | 3200 |
| MI2.16(g/10 min) | 0.81 | 0.79 |
| MI21.6/MI2.16 | 23.6 | 17.9 |
| Density(g/cc) | 0.9367 | 0.9365 |
| Melt Fracture Occurrence RPM | 42 | 25 |
| Tensile Strength (50 mm/min), (kg/cm²) | 436 | 414 |
| Tensile Strength (200 mm/min), (kg/cm²) | 404 | 379 |
| Shear thinning | −0.34 | −0.28 |

It can be seen from Table 2 that the metallocene catalyst in which the first metallocene compound of Formula 1 and the second metallocene compound of Formula 2 are hybrid-supported on the carrier exhibits a higher melt flow rate ($MI_{21}/MI_2$) than the case of using the single metallocene catalyst of the non-bridge structure having the ligand of the symmetrical structure in Comparative Example 6, and melt fracture occurrence rpm is 42 rpm in Example 13, which is excellent in processability, whereas melt fracture occurrence rpm is 23 rpm in Comparative Example 6. In addition, although the melt index ratio was increased to improve the processability, the tensile strength was equal to or higher than that of Comparative Example 6, and the mechanical properties were not deteriorated.

When comparing Table 1 with Table 2, it can be seen that the melt flow rate ($MI_{21}/MI_2$) of the polymerized resin is reduced in the gas phase continuous reactor as compared with the batch type autoclave reactor.

In the preparation of the hybrid supported metallocene catalyst, as compared with the metallocene compound of the bridge structure which has the ligand of the symmetrical structure according to the present invention, the use of the second metallocene compound of Formula 2 having the bridge structure having the ligand of the asymmetric structure may have a controlled resin melt index, thereby maintaining mechanical properties while increasing processability.

While the present invention has been particularly shown and described with reference to exemplary embodiments thereof, the present invention is not limited to the specific exemplary embodiments. It will be understood by those of ordinary skill in the art that various modifications may be made thereto without departing from the spirit and scope of the present invention as defined by the appended claims, and such modifications fall within the scope of the claims.

The invention claimed is:

1. A hybrid supported metallocene catalyst comprising:
at least one first metallocene compound, at least one second metallocene compound, at least one cocatalyst compound selected from compound groups represented by Formulae 3 to 6, and a carrier,
wherein the carrier comprises silica and has an average particle size of 10 microns to 250 microns, a microporous volume of 0.1 cc/g to 10 cc/g, a specific surface area of 1 m²/g to 1,000 m²/g, and a hydroxy group concentration of 0.1 mmol/g to 5 mmol/g,

[Formula 3]

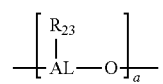

wherein, in Formula 3,
AL is aluminum,
R$_{23}$ is each independently a halogen atom, a C$_1$-C$_{20}$ hydrocarbon group, or a C$_1$-C$_{20}$ hydrocarbon group substituted with halogen, and
a is an integer of 2 or more,

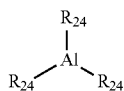 [Formula 4]

wherein, in Formula 4,
Al is aluminum or boron, and
R$_{24}$ is each independently a halogen atom, a C$_1$-C$_{20}$ hydrocarbon group, a C$_1$-C$_{20}$ hydrocarbon group substituted with halogen, or a C$_1$-C$_{20}$ alkoxy group,

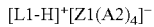 [Formula 5]

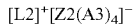 [Formula 6]

wherein, in Formulae 5 and 6,
L1 and L2 are each independently neutral or cationic Lewis acids,
Z1 and Z2 are each independently group 13 elements of the periodic table of the elements, and
A2 and A3 are each independently a substituted or unsubstituted C$_6$-C$_{20}$ aryl group or a substituted or unsubstituted C$_1$-C$_{20}$ alkyl group,
wherein the first metallocene compound comprises at least one selected from the group consisting of [Indenyl (cyclopentadienyl)]zirconium dichloride, [2-methyl benzeindenyl (cyclopentadienyl)]zirconium dichloride, [Indenyl (tetramethylcyclopentadienyl)]zirconium dichloride, and [2-methyl benzeindenyl (tetramethylcyclopentadienyl)]zirconium dichloride, and
wherein the second metallocene compound comprises at least one selected from the group consisting of dimethylsilyl(tetramethylcyclopentadienyl)(2-phenylindenyl)zirconium dichloride, dimethylsilyl {tetramethylcyclopentadienyl}{2-methyl-4-(4-tert-butylphenyl)indenyl}zirconium dichloride, and dimethylsilyl(2-methyl-4-phenylindenyl)(tetramethylcyclopentadienyl)zirconium dichloride.

2. The hybrid supported metallocene catalyst of claim 1, wherein the compound represented by Formula 3 comprises at least one selected from the group consisting of methylaluminoxane, ethylaluminoxane, isobutylaluminoxane, and butylaluminoxane.

3. The hybrid supported metallocene catalyst of claim 1, wherein the cocatalyst compound represented by Formula 4 comprises at least one compound selected from the group consisting of trimethylaluminum, triethylaluminum, triisobutylaluminum, tripropylaluminum, tributylaluminum, dimethylchloroaluminum, triisopropylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, and tripentafluorophenylboron.

4. The hybrid supported metallocene catalyst of claim 1, wherein the cocatalyst compound represented by Formula 5 or 6 comprises at least one selected from the group consisting of methyldioctadecylammonium tetrakis(pentafluorophenyl)borate, trimethylammonium tetrakis(phenyl)borate, triethylammonium tetrakis(phenyl)borate, tripropylammonium tetrakis(phenyl)borate, tributylammonium tetrakis (phenyl)borate, trimethylammonium tetrakis(p-tolyl)borate, tripropylammonium tetrakis(p-tolyl)borate, trimethylammonium tetrakis(o,p-dimethylphenyl)borate, triethylammonium tetrakis (o,p-dimethylphenyl)borate, trimethylammonium tetrakis(p-trifluoromethylphenyl)borate, tributylammonium tetrakis(p-trifluoromethylphenyl)borate, tributylammonium tetrakis(pentafluorophenyl)borate, diethylammonium tetrakis(pentafluorophenyl)borate, triphenylphosphonium tetrakis(phenyl)borate, trimethylphosphonium tetrakis(phenyl)borate, N,N-diethylanilinium tetrakis(phenyl)borate, N,N-dimethylanilinium tetrakis(pentafluorophenyl)borate, N,N-diethylanilinium tetrakis(pentafluorophenyl)borate, triphenylcarbonium tetrakis(p-trifluoromethylphenyl)borate, triphenylcarbenium tetrakis (pentafluorophenyl)borate, trimethylammonium tetrakis (phenyl)aluminate, triethylammonium tetrakis(phenyl)aluminate, tripropylammonium tetrakis(phenyl)aluminate, tributylammonium tetrakis(phenyl)aluminate, trimethylammonium tetrakis(p-tolyl)aluminate, tripropylammonium tetrakis(p-tolyl)aluminate, triethylammonium tetrakis(o,p-dimethylphenyl)aluminate, tributylammonium tetrakis(p-trifluoromethylphenyl)aluminate, trimethylammonium tetrakis(p-trifluoromethylphenyl)aluminate, tributylammonium tetrakis(pentafluorophenyl)aluminate, N,N-diethylanilinium tetrakis(phenyl)aluminate, N,N-diethylanilinium tetrakis(phenyl)aluminate, N,N-diethylanilinium tetrakis (pentafluorophenyl)aluminate, diethylammonium tetrakis (pentafluorophenyl)aluminate, triphenylphosphonium tetrakis(phenyl)aluminate, trimethylphosphonium tetrakis (phenyl)aluminate, triethylammonium tetrakis(phenyl)aluminate, and tributylammonium tetrakis(phenyl)aluminate.

5. The hybrid supported metallocene catalyst of claim 1, wherein a ratio of a total mass of a transition metal of the first metallocene compound and a transition metal of the second metallocene compound to a mass of the carrier is 1:10 to 1:1,000, and
a mass ratio of the first metallocene compound to the second metallocene compound is 1:100 to 100:1.

6. The hybrid supported metallocene catalyst of claim 1, a mass ratio of the cocatalyst compound represented by Formulae 3 and 4 to the carrier is 1:100 to 100:1, and
a mass ratio of the cocatalyst compound represented by Formulae 5 and 6 to the carrier is 1:20 to 20:1.

7. A method for preparing a hybrid supported metallocene catalyst, comprising the steps of
preparing at least one first metallocene compound, at least one second metallocene compound, and at least one cocatalyst compound;
stirring the prepared first metallocene compound, the prepared second metallocene compound, and the prepared cocatalyst compound at a temperature of 0° C. to 100° C. for 5 minutes to 4 hours to prepare a catalyst mixture; and
adding the catalyst mixture to a reactor in which a carrier and a solvent are present, and stirring the mixture at a temperature of 0° C. to 100° C. for 3 minutes to 48 hours to prepare the hybrid supported metallocene catalyst of claim 1,
wherein the first metallocene compound and the second metallocene compound each independently have a central metal concentration of $1*10^{-5}$ mol/l to $9*10^{-5}$ mol/l, wherein the first metallocene compound comprises at least one selected from the group consisting of [Indenyl(cyclopentadienyl)]zirconium dichloride, [2-methyl benzeindenyl (cyclopentadienyl)]zirconium dichloride, [Indenyl (tetramethylcyclopentadienyl)]zirconium dichloride, and [2-methyl benzeindenyl (tetramethylcyclopentadienyl)]zirconium dichloride, and wherein the second metallocene compound comprises at least one selected from the group consisting of dimethylsilyl(tetramethylcyclopentadienyl)(2-phenylindenyl)zirconium dichloride, dimethylsilyl {tetramethylcyclopentadienyl}{2-methyl-4-(4-tert-butylphenyl)indenyl}zirconium dichloride, and dimethylsilyl(2-methyl-4-phenylindenyl)(tetramethylcyclopentadienyl)zirconium dichloride.

8. The method of claim 7, wherein the cocatalyst compound comprises at least one selected from the group consisting of compounds represented by Formulae 3 to 6

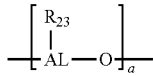

[Formula 3]

wherein, in Formula 3,

AL is aluminum, $R_{23}$ is each independently a halogen atom, a $C_1$-$C_{20}$ hydrocarbon group, or a $C_1$-$C_{20}$ hydrocarbon group substituted with halogen, and a is an integer of 2 or more,

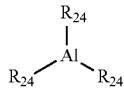

[Formula 4]

wherein, in Formula 4,

Al is aluminum or boron, and $R_{24}$ is each independently a halogen atom, a $C_1$-$C_{20}$ hydrocarbon group, a $C_1$-$C_{20}$ hydrocarbon group substituted with halogen, or a $C_1$-$C_{20}$ alkoxy group, $[L1-H]^+[Z1(A2)_4]^-$ [Formula 5]

$[L2]^+[Z2(A3)_4]^-$ [Formula 6]

wherein, in Formulae 5 and 6,

L1 and L2 are each independently neutral or cationic Lewis acids,

Z1 and Z2 are each independently group 13 elements of the periodic table of the elements, and A2 and A3 are each independently a substituted or unsubstituted $C_6$-$C_{20}$ aryl group or a substituted or unsubstituted $C_1$-$C_{20}$ alkyl group.

9. The method of claim 7, further comprising precipitating the supported catalyst composition to separate a supernatant;

removing the separated supernatant and washing the remaining catalyst composition precipitate with a solvent; and vacuum-drying the washed catalyst composition precipitate at a temperature of 20° C. to 200° C. for 1 hour to 48 hours.

10. A method for preparing a polyolefin resin having excellent processability, comprising adding the hybrid supported metallocene catalyst prepared by the method for preparing the hybrid supported metallocene catalyst of claim 7 and an olefin monomer to an autoclave reactor or a gas phase polymerization reactor, and performing polymerization into a polyolefin in an environment in which a temperature is 0° C. to 120° C. and a pressure is 1 bar to 150 bar.

11. The method of claim 10, wherein the olefin monomer comprises at least one selected from the group consisting of propylene, 1-butene, 1-pentene, 3-methyl-1-butene, 1-hexene, 4-methyl-1-pentene, 3-methyl-1-pentene, 1-heptene, 1-octene, and 1-decene.

\* \* \* \* \*